United States Patent
McInnes

(10) Patent No.: US 11,291,185 B2
(45) Date of Patent: Apr. 5, 2022

(54) ANIMAL FEEDING TEATS AND A TEAT MOUNTING SYSTEM

(71) Applicant: Ross Gordon McInnes, Waipu (NZ)

(72) Inventor: Ross Gordon McInnes, Waipu (NZ)

(*) Notice: Subject to any disclaimer, the term of this patent is extended or adjusted under 35 U.S.C. 154(b) by 979 days.

(21) Appl. No.: 15/781,016

(22) PCT Filed: Dec. 1, 2016

(86) PCT No.: PCT/NZ2016/050190
§ 371 (c)(1),
(2) Date: Jun. 1, 2018

(87) PCT Pub. No.: WO2017/095238
PCT Pub. Date: Jun. 8, 2017

(65) Prior Publication Data
US 2020/0260688 A1    Aug. 20, 2020

(30) Foreign Application Priority Data
Dec. 1, 2015 (NZ) .......................................... 714706

(51) Int. Cl.
*A01K 9/00* (2006.01)

(52) U.S. Cl.
CPC .................................... *A01K 9/005* (2013.01)

(58) Field of Classification Search
CPC ........... A01K 9/005; A01K 9/00; A01K 7/027
USPC ..................................................... 119/71, 73
See application file for complete search history.

(56) References Cited

U.S. PATENT DOCUMENTS

| | | | |
|---|---|---|---|
| 1,207,052 A | 12/1916 | Johnson | |
| 2,350,215 A | 5/1944 | Christensen | |
| 2,516,730 A | 7/1950 | Stevens | |
| 2,522,757 A | 9/1950 | Larson | |
| 2,535,159 A | 12/1950 | Rhinehart | |
| 2,672,124 A | 3/1954 | McCrary | |
| 4,633,814 A * | 1/1987 | Eastman | A01K 9/005 119/71 |

(Continued)

FOREIGN PATENT DOCUMENTS

| | | |
|---|---|---|
| CN | 203058044 U | 7/2013 |
| DE | 946754 C | 8/1956 |

(Continued)

OTHER PUBLICATIONS

Search Report issued in Chinese Patent Application No. 2016800708120 dated Jul. 15, 2020 with partial English machine translation provided.

(Continued)

*Primary Examiner* — Yvonne R Abbott-Lewis
(74) *Attorney, Agent, or Firm* — Nixon & Vanderhye

(57) ABSTRACT

Animal feeding teats are often removed from a feeding receptacle for cleaning or for re-use on a larger receptacle. A nipple end of the teats is typically designed for use in a specific orientation to aid the suckling of a young animal, and therefore the teats need to be fitted to the feeding receptacle correctly. The animal feeding teat has a rectangular connection feature in a base end of the teat that is designed to mate with a similarly shaped feature on a feeding receptacle. It is considered important that the connection feature has only one or two lines of symmetry, so that the teat can only be fitted in one or two orientations relative to the receptacle.

20 Claims, 4 Drawing Sheets

(56) References Cited

U.S. PATENT DOCUMENTS

Figure 1:
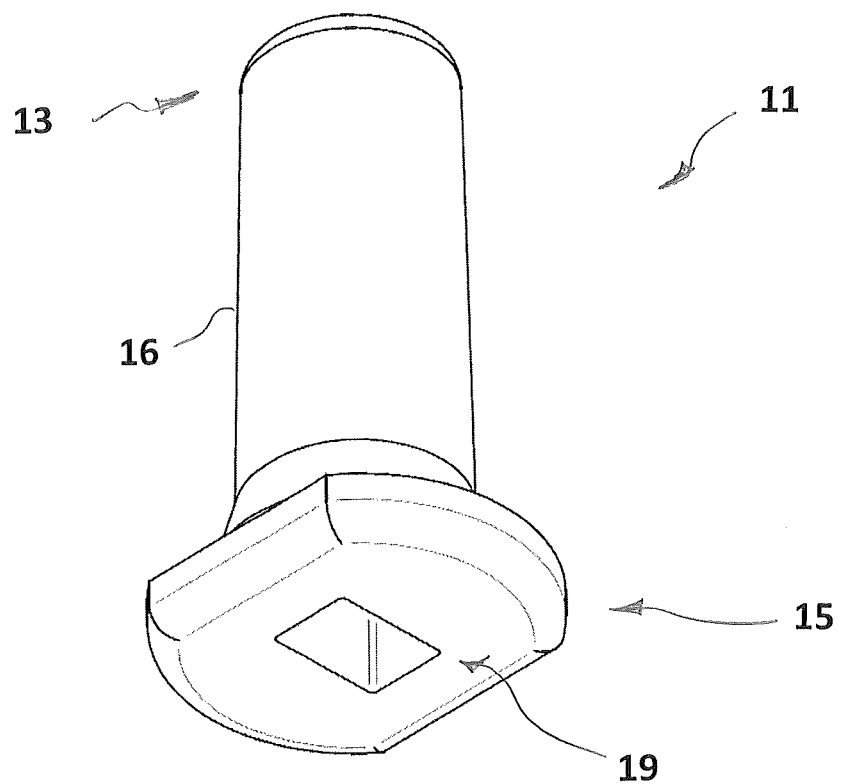

| | | | |
|---|---|---|---|
| 5,598,809 A | 2/1997 | McInnes | |
| 5,788,097 A | 8/1998 | McInnes | |
| 8,336,495 B1 | 12/2012 | Dumm | |
| 8,408,408 B1 * | 4/2013 | Dumm | A61J 11/04 |
| | | | 215/11.1 |

FOREIGN PATENT DOCUMENTS

| | | |
|---|---|---|
| DE | 29901807 | 7/2000 |
| DE | 10 2011 105 853 B3 | 7/2012 |
| DE | 20 2014 1 03 535 U1 | 9/2014 |
| GB | 2490735 | 11/2012 |
| RU | 2098951 C1 | 12/1997 |
| UA | 65051 A | 3/2004 |
| WO | 94/04023 | 3/1994 |
| WO | 01/64028 A1 | 9/2001 |

OTHER PUBLICATIONS

Office Action issued in Colombian Patent Application No. NC2018/0006816 dated Sep. 18, 2019.
New Zealand Examination Report for Application No. 727000, dated Dec. 10, 2018.
International Search Report, dated Feb. 9, 2017, from corresponding PCT application No. PCT/NZ2016/050190.
Office Action issued in Russian Patent Application No. 2018121957/13(034731) dated Feb. 19, 2020 with English translation provided.
Search Report issued in Russian Patent Application No. 2018121957/13(034731) dated Feb. 14, 2020 with English translation provided.
Extended European Search Report issued in European Patent Application No. 16871117 dated Nov. 15, 2019.

* cited by examiner

ANIMAL FEEDING TEATS AND A TEAT MOUNTING SYSTEM

FIELD OF THE INVENTION

This invention relates to animal feeding teats and to teat mounting systems, and in particular, but not exclusively to a young animal feeding teat and a system for mounting young animal feeding teats to young animal feeding equipment.

BACKGROUND

Modern dairy farming practices in particular, often involves the feeding of large numbers of young animals, for example calves, lambs and goat kids, from an early age. The young animals are typically separated from their mothers in the first 24 hours from birth, and are initially trained to drink milk from an artificial teat. The teat is supplied with milk from a bottle, or via a tube from a bucket, or from a teat fitted to a feeder bowl, manifold, trough or tank.

It is helpful if the teat can prevent leakage of milk when a young animal is not drinking from the teat, for example when preparing a bowl or tank with milk and prior to the young animal drinking from the teat. But at the same time, the teats need to provide a controlled and adequate flow of milk to the young animal when the young animal suckles the teat.

It is helpful if the teat delivers the milk correctly into the mouth of the young animal so that it can sense the milk entering its mouth as naturally as possible, and to allow it to swallow the milk without choking. For these reasons teats are often designed with orifices having specific configurations, for example a vertical slit, or a cross shaped orifice. Such eats are designed so that as the young animal suckles, the squeezing action between the tongue and the roof of the mouth opens the orifice in the teat correctly and the milk is received into the mouth of the young animal at the desired rate and in the correct orientation.

And since the design of the teat and the orifice in the end of the teat is important, it is therefore important that a teat is oriented in a specific manner when it is used, or when it is fitted to a young animal feeding device. If a young animal feeding teat is not used or fitted correctly, the teat not will deliver the milk at the desired rate, or in the desired direction into the mouth of the young animal. Some teats will not even allow milk to flow if they are not within 15 to 20 degrees of their designed orientation.

In addition to this requirement, young animal feeding equipment must be regularly cleaned, preferably immediately after each use, since milk provides an ideal breeding ground for many pathogens.

This requirement to remove teats regularly for washing, and to orient them in a particular manner for correct use, provides an opportunity for mistakes to be made. For this reason, many teats are marked, for example with the wording "TOP" to indicate the side of the teat that should be uppermost. But many teats are fitted with screw threaded caps, and it can be time consuming to the align the teat just right within the screw cap so that the desired part of the teat is at the top when the teat is screwed onto the container tight enough to prevent leaks.

On farms where calving occurs within a specific season, the young animal feeding duties typically occur at the busiest time of the year. In such cases, the hassle of orienting teats correctly each time the calves are fed, or the equipment is cleaned, can be a significant burden at an already busy time.

On farms where calving is continuous through part or all of the year, it is increasingly common to start a new calf on a new teat fitted to a single teat feeder bowl or to a bottle, and to keep the calf in an individual pen for a number of days or weeks. When there are enough calves of similar age the calves are placed in a group. The teats that the calves have used in their individual pen are then removed from the single teat feeder bowl or bottle, and are placed in a multi teat feeder bowl for the group. As the teats are re-used, an easy attachment system is required. Also, keeping the orientation of the teat correct is essential when transferring it. A new teat is then fitted to the single teat feeder bowl or bottle for the next new calf. The same system can be used for infant goats or sheep.

Also, the manufacture of feeding troughs or bowls that have threaded attachment points can be difficult. That is because it is difficult to extract a threaded portion from an injection moulding tool for example. Other items such as bottles can be rotated to help remove them from a tool, but a large bowl, having a number of threaded bosses cannot be removed in this way. Complex tooling is therefore required, with parts of the tool that can be withdrawn after each manufacturing sequence, to allow the moulded item to be removed.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Object

It is therefore an object of the present invention to provide an animal feeding teat, and/or a teat mounting system, which will at least go some way towards overcoming one or more of the above mentioned problems, or at least provide the public with a useful choice.

STATEMENTS OF THE INVENTION

Accordingly, in a first aspect, the invention may broadly be said to consist in an animal feeding teat, the teat having a nipple end and a base end, the nipple end having one or more openings configured to discharge milk in a desired manner into the mouth of an animal, and the base end being configured to engage with a milk receptacle adapted to supply milk to the teat, and the base end includes a connection feature that is configured to engage with a complementary feature on a milk receptacle, wherein the shape of the connection feature, when considered in a base end plane, has two or fewer lines of symmetry, the base end plane being perpendicular to the intended direction of the supply of milk from a milk receptacle into the base end of the teat.

Preferably the connection feature in the base end of the teat has two lines of symmetry.

Preferably the connection feature in the base end of the teat has a substantially rectangular shape, or cross-sectional shape, in the base plane.

Optionally the connection feature in the base end of the teat has a substantially elliptical shape, or cross-sectional shape, in the base plane.

Preferably the connection feature in the base end is a female feature which is configured to mate with a complementary male feature or spigot on a milk receptacle adapted to supply milk to the teat.

Preferably the connection feature in the base end of the teat is configured to mate with the complementary feature on a milk receptacle in such a manner that a seal is formed between the connection feature in the base end of the teat and the complementary feature on a milk receptacle.

Preferably at least one of the lines of symmetry of the connection feature in the base end is aligned with, or is perpendicular to, an opening or openings in the nipple end of the teat.

Preferably the milk receptacle is a tank configured to supply multiple teats and having multiple complementary features configured to engage with each of the teats.

In a second aspect, the invention may broadly be said to consist in a teat mounting system for use with a teat substantially as specified herein, the teat mounting system having one or more retainer members configured to secure the teat to a receptacle that is configured to supply milk to the teat.

Preferably the or each retainer member is pivotally connected to the receptacle at a first end, and has a snap fit to the receptacle at a second end.

Optionally the or each retainer member is connected to the receptacle with a threaded connection.

In a third aspect, the invention may broadly be said to consist in an animal feeding apparatus having a milk receptacle and incorporating at least one animal feeding teat substantially as specified herein.

Preferably the milk receptacle includes a connection feature that is complementary to the connection feature of the animal feeding teat.

Preferably animal feeding apparatus includes a receptacle in the form of a tank.

Preferably the tank is configured to receive multiple animal feeding teats.

In a fourth aspect, the invention may broadly be said to consist in an animal feeding apparatus incorporating a teat mounting system substantially as specified herein.

In a fifth aspect, the invention may broadly be said to consist in a method of fitting an animal feeding teat to an animal feeding apparatus, wherein the method includes the steps of;

Aligning the teat such that a connection feature of the teat mates correctly with a complementary connection feature of a receptacle of the animal feeding apparatus, Securing the teat onto the receptacle using a fastening system.

Preferably the fastening system includes the use of one or more snap fit retainers that are configured to secure the base end of the teat to the receptacle.

Optionally the fastening system includes a threaded retainer which secures the base end of the teat to the receptacle.

In a further aspect, the invention may broadly be said to consist in an adapter for use with animal feeding bowls, the adapter being configured to engage with a boss or spigot on a feeding bowl or trough and having provisions to engage with an animal feeding teat substantially as specified herein.

In a further aspect, the invention may broadly be said to consist in an animal feeding apparatus having a milk receptacle that is adapted to supply milk to one or more teats when in use, the milk receptacle having one or more connection features in the form of spigots capable of providing a supply of milk from the milk receptacle to an animal feeding teat, wherein a shape of the or each spigot has two or fewer lines of symmetry when the shape is considered in a plane perpendicular to an intended direction of the supply of milk from the milk receptacle into an animal feeding teat.

Preferably the shape of the or each spigot is substantially rectangular in a plane perpendicular to an intended direction of the supply of milk from the milk receptacle into an animal feeding teat.

Preferably the animal feeding apparatus further includes one or more animal feeding teats, and a base portion of the or each animal feeding teat is configured to engage with the or each spigot.

Preferably the or each animal feeding teat includes a teat connection feature that is complementary to the or each connection feature of the milk receptacle.

Preferably the animal feeding apparatus further includes at least one teat mounting system, the or each teat mounting system having one or more retainer members each configured to secure an animal feeding teat to the milk receptacle.

Preferably the animal feeding apparatus further includes one or more adapters, the or each adapter having a teat receiving portion and a connector portion, the teat receiving portion being configured to mate with an animal feeding teat, and the connector portion having a female receiving portion configured to mate with the or each spigot.

Preferably the animal feeding apparatus further includes one or more animal feeding teats, and a base portion of the or each animal feeding teat is configured to engage with the teat receiving portion of the or each adapter.

Preferably the animal feeding apparatus further includes one or more retainer members each configured to secure an adapter to the milk receptacle.

Preferably the milk receptacle is a tank configured to supply multiple teats and having multiple complementary features configured to engage with each of the teats spigots.

In a further aspect, the invention may broadly be said to consist in an animal feeding teat and teat adapter assembly, the animal feeding teat and teat adapter assembly comprising an animal feeding teat and a teat adapter; the animal feeding teat having a nipple end and a base end, the nipple end having one or more openings configured to discharge milk into the mouth of an animal; the teat adapter having a teat receiving portion and a connector portion and being configured to receive milk from a milk receptacle and to provide a flow path for the milk to the teat; the base end of the animal feeding teat being configured to engage with the teat receiving portion of the adapter; and the connector portion of the adapter includes a connection feature that is configured to engage with a complementary feature on a milk receptacle, wherein a shape of the connection feature has two or fewer lines of symmetry when the shape is considered in a plane perpendicular to an intended direction of the supply of milk from a milk receptacle into the animal feeding teat.

Preferably the shape of the connection feature of the connector portion of the teat adapter has two lines of symmetry.

Preferably the shape of the connection feature of the connector portion of the teat adapter has a substantially rectangular shape.

Preferably the connection feature of the connector portion of the teat adapter is a female feature which is configured to mate with a complementary male feature or spigot on a milk receptacle.

And in a yet a further aspect, the invention may broadly be said to consist in an adapter for an animal feeding teat, the adapter having a connector portion and a teat receiving portion and the adapter is configured to allow milk to flow from the connector portion to the teat receiving portion when in use; the connector portion being configured to engage with a milk receptacle adapted to supply milk to one or more animal feeding teats, and the connector portion includes a connection feature that is configured to engage with a complementary feature on a milk receptacle; and the shape of the connection feature has two or fewer lines of symmetry when the shape is considered in a plane perpendicular to an intended direction of a flow of milk from the connector portion to the teat receiving portion.

Preferably the connection feature in the connector portion is a female feature which is configured to mate with a complementary male feature or spigot on a milk receptacle.

Preferably the connection feature in the connection portion of the adapter has two lines of symmetry.

Preferably the connection feature in the connection portion of the adapter has a substantially rectangular shape in a plane perpendicular to an intended direction of a flow of milk from the connector portion to the teat receiving portion.

Preferably the connection feature in the connection portion of the adapter has a substantially elliptical shape in a plane perpendicular to an intended direction of a flow of milk from the connector portion to the teat receiving portion.

Preferably the connection feature in the connection portion of the adapter is configured to mate with a complementary feature on a milk receptacle in such a manner that a seal is formed between the connection feature in the connection portion of the adapter and a complementary feature on a milk receptacle.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Figure 2:
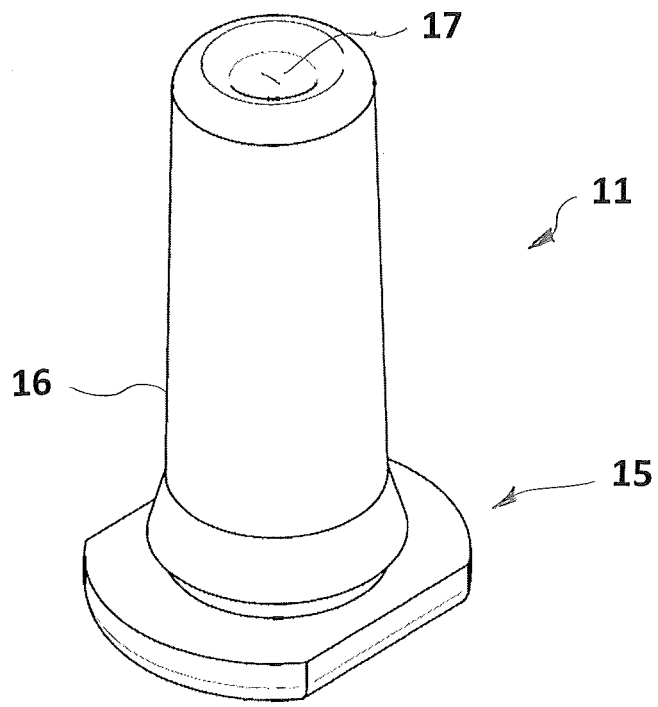
Figure 3:
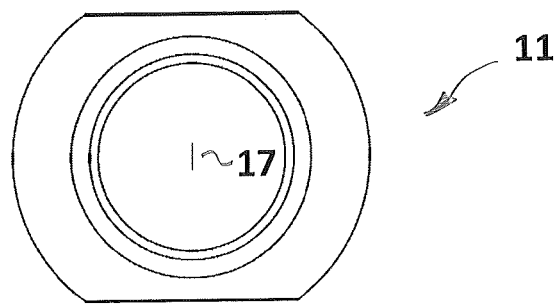
Figure 4:
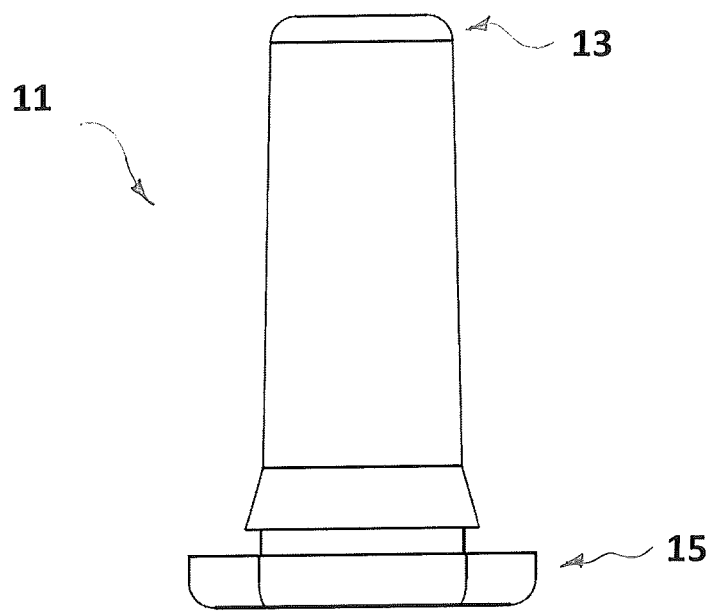
Figure 5:
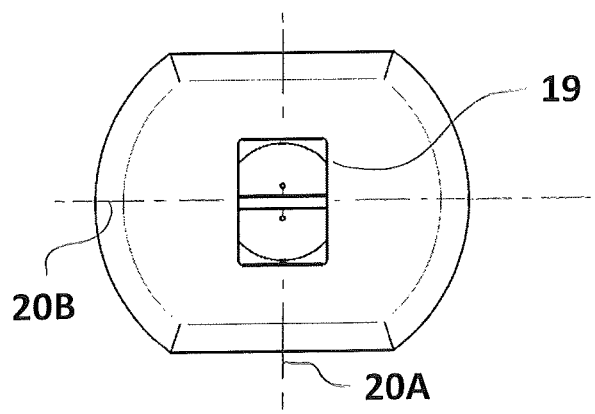
Figure 6:
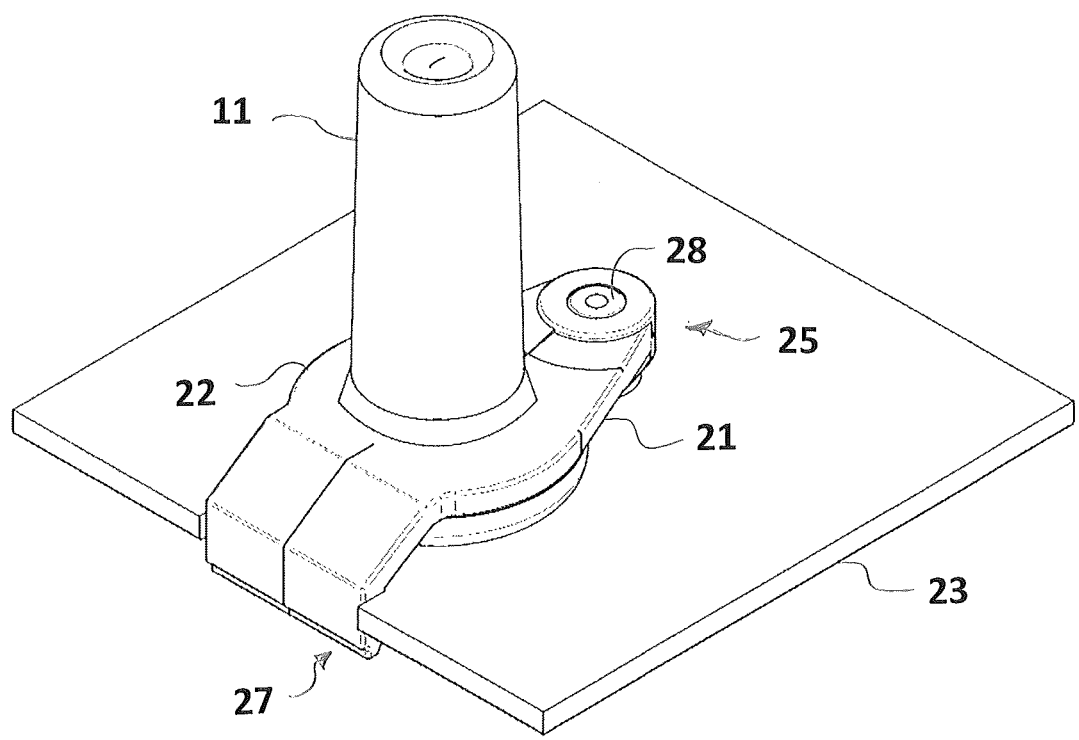
Figure 7:
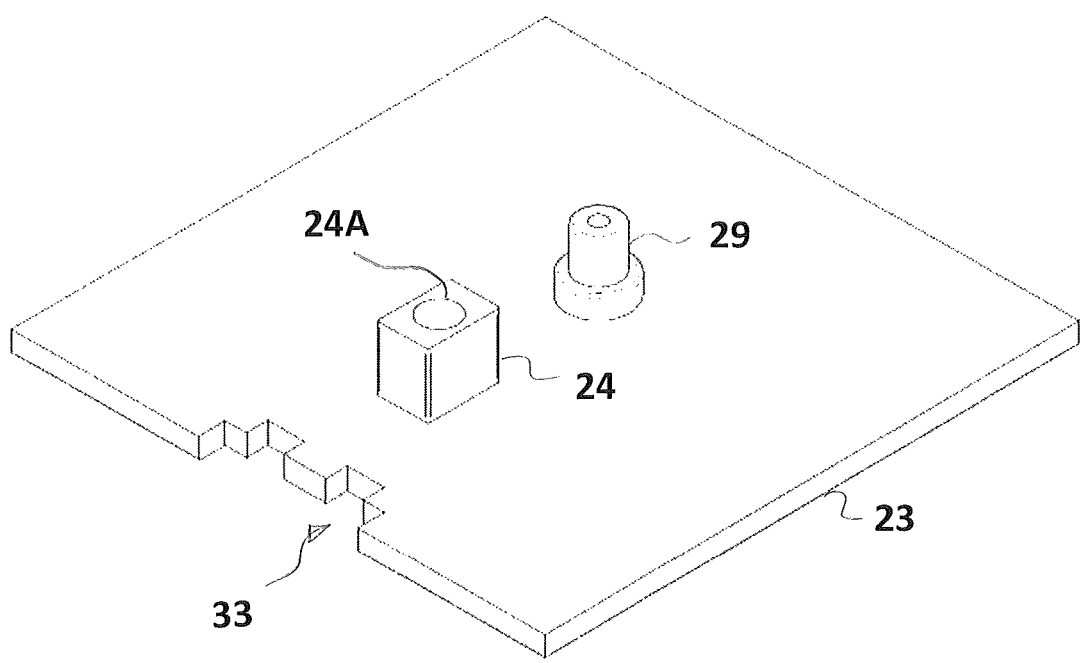
Figure 8:
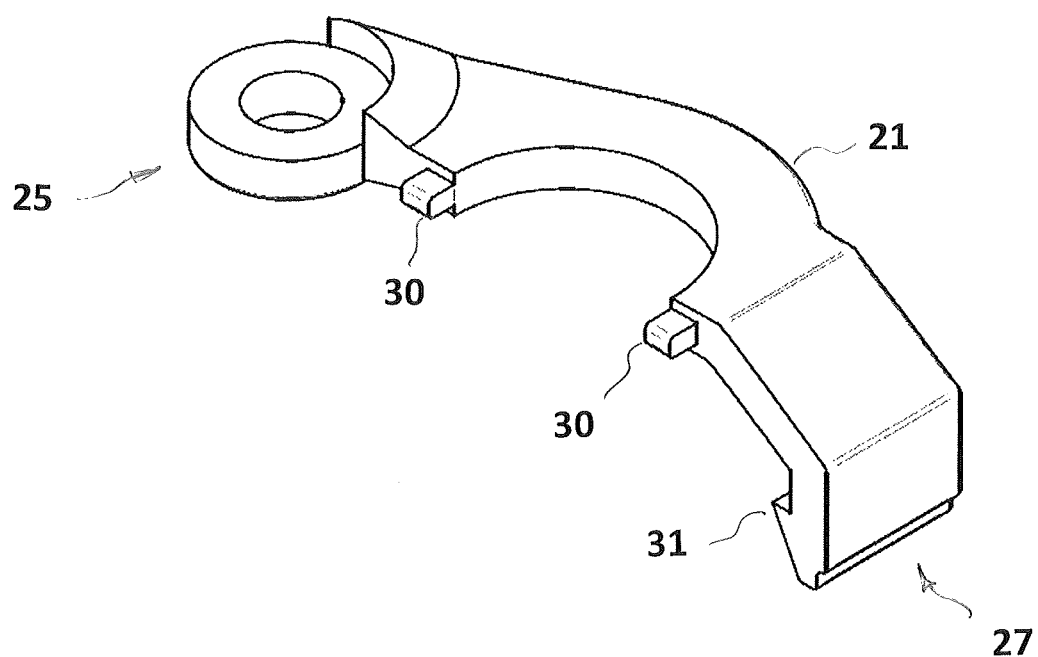
Figure 9:
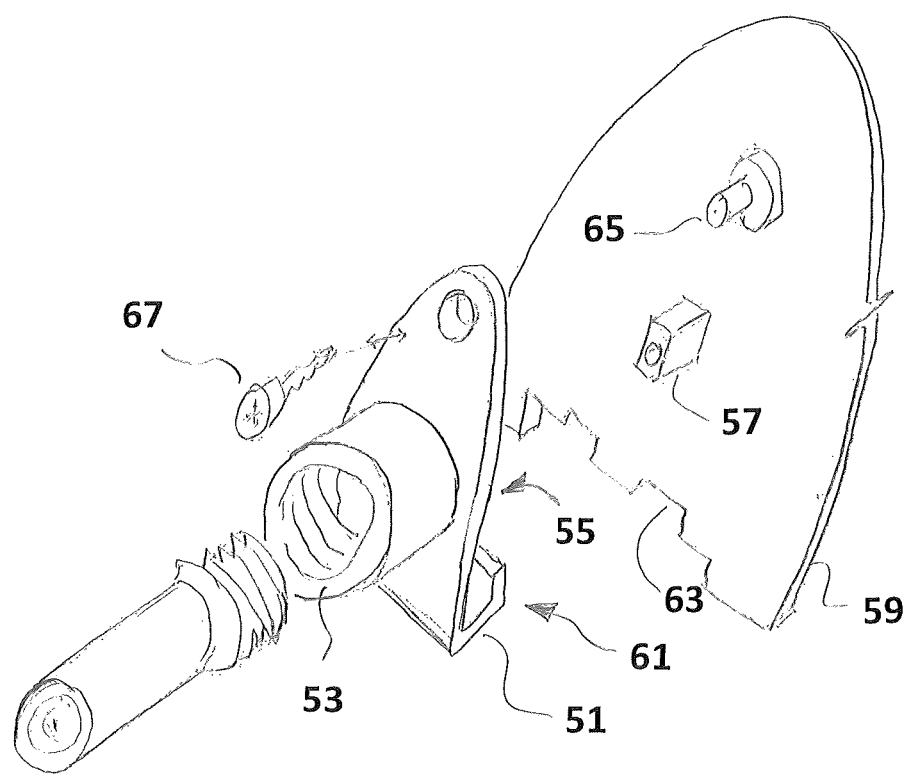

Further aspects of the present invention will become apparent from the following description which is given by way of example only and with reference to the accompanying drawings in which:

FIG. 1 is a perspective view of an animal feeding teat according to the present invention, the teat viewed from a base end, FIG. 2 is a perspective view of the animal feeding teat viewed from a nipple end, FIG. 3 is an end elevation view of the animal feeding teat, viewed from the nipple end, FIG. 4 is a plan view of the animal feeding teat, FIG. 5 is an end elevation view of the animal feeding teat, viewed from the base end, FIG. 6 is a perspective view showing a teat mounting system incorporating the animal feeding teat, FIG. 7 is a perspective view of a section of the side of a receptacle for holding milk, the receptacle being configured to mate with the animal feeding teat, and FIG. 8 is a perspective view showing a clip of the teat mounting system, and FIG. 9 is a perspective view of an adapter for use with animal feeding teats.

With reference to FIGS. 1 to 5, an animal feeding teat (11) according to the present invention will now be described. The animal feeding teat (11) has a particular connection feature and is configured to mate with a receptacle, for example an animal feeding bowl, manifold, tank or trough, that has a complementary mounting feature. The connection feature is designed to ensure that the animal feeding teat (11) is always fitted to the receptacle in a specific orientation.

The ability to ensure that the animal feeding teat (11) is always fitted to the receptacle in a particular orientation is helpful in that it ensures that the teat can always be oriented exactly as intended by its designers for the best possible performance as an animal feeding teat.

As with most other teats on the market, the animal feeding teat (11) has a nipple end (13) and a base end (15). The nipple end (13) and the base end (15) are each formed at opposite ends of a body section (16). In this example, the nipple end (13) has a single opening, in the form of a slit (17). The slit (17) is best aligned vertically when in use. The teat (11) is configured to discharge milk in a desired manner into the mouth of a young animal only when the slit (17) is aligned vertically in relation to the young animal suckling on the teat (11).

The base end (15) is configured to engage with a receptacle, for example a bowl or manifold that is used to hold milk and to supply the milk to the teat. The base end (15) includes a connection feature (19) which in this example is in the form of a rectangular shaped recess that extends into the base end (15) of the teat. The connection feature (19) communicates with a hollow interior of the body section (16). When in use, milk flows through the connection feature (19), and through the hollow interior of the body section (16), and to the slit (17).

The connection feature (19) is configured to engage with a complementary feature on a receptacle, for example a rectangular spigot on a young animal feeding bowl or manifold. An important aspect of the connection feature (19) is that it has two or fewer lines of symmetry and in this example, two lines of symmetry. The lines of symmetry are lines of symmetry when considering the shape of the connection feature (19) within a plane of the base end (15), or a 'base end plane'. The base end plane is a plane that is perpendicular to the direction of the supply of milk from the receptacle into the base end (15) of the teat (11).

As mentioned above, the connection feature (19) in the base end (15) of the teat (11) has two lines of symmetry. The connection feature (19) has a cross sectional shape which is substantially rectangular, and the two lines of symmetry are the two axes of the substantially rectangular shape. The two lines of symmetry are shown in FIG. 5, a first line of symmetry (20A) which is aligned with, or is parallel to, the length of the slit (19), and a second line of symmetry (20B) which is perpendicular the first line of symmetry (20A).

The connection feature (19) in the base is a female feature which is configured to mate with a complementary male feature on the receptacle adapted to supply milk to the teat. The connection feature in the base end (15) of the teat is configured to mate with the complementary feature on the receptacle in such a manner that a seal is formed between the connection feature in the base of the teat and the complementary feature on the receptacle.

The lines of symmetry of the connection feature in the base are either aligned with, or are perpendicular to, the slit (17) in the nipple end (13) of the teat (11).

The teats (11) are commonly used on individual feeding bottles, and multiple teats (11) are commonly used on receptacles such as bowls, manifolds, troughs or tanks which are configured to feed a number of animals at one time. In such cases, the receptacles have multiple complementary features configured to engage with the teats (11).

With reference to FIGS. 6 to 8, a teat mounting system for use with the teat (11) will now be described. The teat mounting system has a first retainer member (21) and a second retainer member (22). The first retainer member (21) and the second retainer member (22) are configured to secure the teat (11) to a receptacle (23) that is configured to supply milk to the teat (11).

Note: in FIGS. 6 and 7, only a small section of the sidewall of a receptacle (23) is shown. The receptacle (23) will typically be a feeding bowl which supplies perhaps 10 to 30 teats.

The connection feature (19) of the teat (11) is configured to mate with a spigot (24) on the receptacle (23). The spigot (24) will typically have an internal passageway or bore (24A) through which milk passes from the receptacle (23) to the back of the teat (11).

It can be seen in FIG. 7 that in this example, the spigot (24) has a rectangular cross section similar to that of the connection feature (19) of the teat (11). The spigot (24) can be tapered to help provide an improved sealing fit between the teat (11) and the receptacle (23) when the teat (11) is fitted. Similarly, the sides of the substantially rectangular spigot (24) can be slightly convex, or curved outwardly a little to assist in achieving a leak resistant seal between the spigot (24) and the connection feature (19) of the teat (11). In addition, the sides of the substantially rectangular recess of the connection feature (19) can be slightly concave to match the convex sides of the spigot (24) to help with the leak resistance.

The retainer members (21) and (22) are pivotally connected to the receptacle (23) at a first end (25). The pivotal connecting of each of the retainer members (21) and (22) is provided by a screw (28) which is inserted into a boss (29) on the side of the receptacle (23). The retainer member (21) has a pair of protrusions (30) that are configured to mate with complimentary sockets (not shown) in the (22) retainer member (21). The protrusions (30) can be configured to have an interference fit with the complimentary sockets, or have an enlarged head that is configured to mate with the complimentary sockets with a snap-fit, so that the retainer members (21) and (22) are held firmly together.

The retainer members (21) and (22) also have a snap fit connection to the receptacle (23) at a second end (27). The snap fit is produced by a tooth (30) on each of the retainer members (21) and (22) that is configured to snap over an edge (33) of the receptacle (23) and to engage with the edge (33).

The teat (11) provides a method of fitting an animal feeding teat to an animal feeding apparatus, wherein the method includes the steps of;

Aligning the teat such that a connection feature of the teat mates correctly with a complementary connection feature of a receptacle of the animal feeding apparatus, Securing the teat onto the receptacle using a fastening system.

With reference to FIG. 9, a teat adapter (51) will now be described. The teat adapter (51) is a device that allows a range of existing teats to be used on a receptacle that is configured for use with the teats (11) to form an animal feeding teat and teat adapter assembly as shown in an exploded view in FIG. 9. The teat adapter (51) has a teat receiving portion (53), and a connector portion (55). The teat receiving portion (53) is configured to mate with existing teats in the usual manner.

The connector portion (55) has a female receiving portion (not shown), and is configured to mate with a spigot (57) on a milk storage receptacle (59). The connection between the female receiving portion and the spigot (57) is designed to be a leak resistant joint, for example by providing a shallow taper on the spigot (57) and pressing the female receiving portion onto the spigot (57).

The teat adapter (51) is also configured such that it can be secured to the receptacle. In this example the teat adapter (51) has a hooked end (61) that is able to grip a lower edge (63) of the receptacle (59), and it has a fastener hole (65) at an opposite end, allowing a screw (67) to be used to secure the teat adapter (51) onto the receptacle (59).

Variations

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

In the example described above, the connection feature (19) of the teat (11) has a rectangular shape. As noted this shape importantly has no more than two lines of symmetry. However, it is envisaged that a number of other shapes that also have two or fewer lines of symmetry could be used, for example an elliptical shape, a rhombus or a kite shape could be used. Or alternatively a shape having only one, or even no lines of symmetry, could be used. The option of two lines of symmetry has the slight advantage that the teat can be fitted quicker than having to align it with a shape having a single line of symmetry or with a shape having no lines of symmetry The example of a retention method described above includes two retention members. It is envisaged that a single retention member could be used, or a greater number if desired. Also, as an alternative to the retainers that are fixed using multiple fastening locations, a threaded collar or similar fitting could be used, that is a threaded collar that engages with a complementary thread on the receptacle.

Definitions

Throughout this specification the word "comprise" and variations of that word, such as "comprises" and "comprising", are not intended to exclude other additives, components, integers or steps.

Advantages

Thus it can be seen that at least the preferred form of the invention provides an animal feeding teat which can be fitted quickly and with very little chance of misalignment.

Also, the use of a teat, or a teat adapter, allows simplified manufacture of receptacles for holding milk in animal feeding apparatus.

The invention claimed is:

1. An animal feeding apparatus having a milk receptacle that is adapted to supply milk to one or more teats when in use, the milk receptacle having one or more connection features in the form of spigots capable of providing a supply of milk from the milk receptacle to an animal feeding teat, wherein a shape of the or each spigot has two or fewer lines of symmetry when the shape is considered in a plane perpendicular to an intended direction of the supply of milk from the milk receptacle into an animal feeding teat, and wherein the animal feeding apparatus further includes at least one teat mounting system, the or each teat mounting system having one or more retainer members, the or each retainer member being configured to secure an animal feeding teat to the milk receptacle.

2. The animal feeding apparatus as claimed in claim 1, wherein the shape of the or each spigot is substantially rectangular in a plane perpendicular to an intended direction of the supply of milk from the milk receptacle into an animal feeding teat.

3. The animal feeding apparatus as claimed in claim 1, wherein the animal feeding apparatus further includes one or more animal feeding teats, and a base portion of the or each animal feeding teat is configured to engage with the or each spigot.

4. The animal feeding apparatus as claimed in claim 3, wherein the or each animal feeding teat includes a teat connection feature that is complementary to the or each connection feature of the milk receptacle.

5. The animal feeding apparatus as claimed in claim 1, wherein the animal feeding apparatus further includes one or more adapters, the or each adapter having a teat receiving portion and a connector portion, the teat receiving portion being configured to mate with an animal feeding teat, and the connector portion having a female receiving portion configured to mate with the or each spigot.

6. The animal feeding apparatus as claimed in claim 5, wherein the animal feeding apparatus further includes one or more animal feeding teats, and a base portion of the or each animal feeding teat is configured to engage with the teat receiving portion of the or each adapter.

7. An animal feeding teat, the teat having a nipple end and a base end, the nipple end having one or more openings configured to discharge milk in a desired manner into the mouth of an animal, and the base end being configured to engage with a milk receptacle adapted to supply milk to the teat, and the base end includes a connection feature that is configured to engage with a complementary feature on the milk receptacle, wherein the shape of the connection feature, when considered in a base end plane, has two or fewer lines of symmetry, the base end plane being perpendicular to the intended direction of the supply of milk from the milk receptacle into the base end of the teat, and the base end is configured to engage with a teat mounting system of the milk receptacle, the teat mounting system having one or more retainer members.

8. The animal feeding teat as claimed in claim 7, wherein the connection feature of the base end of the teat is a female feature which is configured to mate with a complementary male feature on the milk receptacle.

9. The animal feeding teat as claimed in claim 7, wherein the connection feature of the base end of the teat has two lines of symmetry.

10. The animal feeding teat as claimed in claim 7, wherein the connection feature of the base end of the teat has a substantially rectangular shape in the base end plane.

11. The animal feeding teat as claimed in claim 7, wherein the connection feature of the base end of the teat has a substantially elliptical shape in the base end plane.

12. The animal feeding teat as claimed in claim 7, wherein at least one of the lines of symmetry of the connection feature of the base end of the teat is aligned with, or is perpendicular to, an opening or openings in the nipple end of the teat.

13. An animal feeding teat and teat adapter assembly, the animal feeding teat and teat adapter assembly comprising an animal feeding teat and a teat adapter; the animal feeding teat having a nipple end and a base end, the nipple end having one or more openings configured to discharge milk into the mouth of an animal; the teat adapter having a teat receiving portion and a connector portion and being configured to receive milk from a milk receptacle and to provide a flow path for the milk to the teat; the base end of the animal feeding teat being configured to engage with the teat receiving portion of the adapter; and the connector portion of the adapter includes a connection feature that is configured to engage with a complementary feature on the milk receptacle, wherein a shape of the connection feature has two or fewer lines of symmetry when the shape is considered in a plane perpendicular to an intended direction of the supply of milk from the milk receptacle into the animal feeding teat, and the adapter is configured to engage with a teat mounting system of the milk receptacle, the teat mounting system having one or more retainer members.

14. The animal feeding teat and teat adapter assembly as claimed in claim 13, wherein the shape of the connection feature of the connector portion of the teat adapter has two lines of symmetry.

15. The animal feeding teat and teat adapter assembly as claimed in claim 13, wherein the shape of the connection feature of the connector portion of the teat adapter has a substantially rectangular shape.

16. An adapter for an animal feeding teat, the adapter having a connector portion and a teat receiving portion and the adapter is configured to allow milk to flow from the connector portion to the teat receiving portion when in use; the connector portion being configured to engage with a milk receptacle adapted to supply milk to one or more animal feeding teats, and the connector portion includes a connection feature that is configured to engage with a complementary feature on the milk receptacle; and the shape of the connection feature has two or fewer lines of symmetry when the shape is considered in a plane perpendicular to an intended direction of a flow of milk from the connector portion to the teat receiving portion, and the adapter is configured to engage with a teat mounting system of the milk receptacle, the teat mounting system having one or more retainer members.

17. The adapter for an animal feeding teat as claimed in claim 16, wherein the connection feature in the connector portion is a female feature which is configured to mate with a complementary male feature or spigot on the milk receptacle.

18. The adapter for animal feeding teat as claimed in claim 16, wherein the connection feature in the connection portion of the adapter has two lines of symmetry.

19. The adapter for an animal feeding teat as claimed in claim 16, wherein the connection feature in the connection portion of the adapter has a substantially rectangular shape in a plane perpendicular to an intended direction of a flow of milk from the connector portion to the teat receiving portion.

20. The adapter for an animal feeding teat as claimed in claim 16, wherein the connection feature in the connection portion of the adapter is configured to mate with a complementary feature on the milk receptacle in such a manner that a seal is formed between the connection feature in the connection portion of the adapter and the complementary feature on the milk receptacle.

* * * * *